(12) United States Patent
Hupfer et al.

(10) Patent No.: US 12,352,993 B2
(45) Date of Patent: Jul. 8, 2025

(54) OPTICAL FIBER APPARATUS

(71) Applicant: AUDI AG, Ingolstadt (DE)

(72) Inventors: Philip Hupfer, Burgthann (DE);
Wolfgang Schermer, Thalmässing (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 18/824,534

(22) Filed: Sep. 4, 2024

(65) Prior Publication Data
US 2025/0085467 A1    Mar. 13, 2025

(30) Foreign Application Priority Data
Sep. 11, 2023  (DE) .......................... 102023124383.7

(51) Int. Cl.
*F21V 8/00*        (2006.01)
*F21S 43/237*   (2018.01)
*F21S 43/249*   (2018.01)

(52) U.S. Cl.
CPC .......... *G02B 6/0006* (2013.01); *F21S 43/237* (2018.01); *F21S 43/2492* (2024.05)

(58) Field of Classification Search
CPC ............... G02B 6/0006; F21V 2200/17; F21S 43/2492; F21S 43/249
See application file for complete search history.

(56) References Cited

U.S. PATENT DOCUMENTS

| | | | |
|---|---|---|---|
| 2009/0310345 A1* | 12/2009 | Holder | F21K 9/68 362/231 |
| 2014/0153272 A1* | 6/2014 | Giraud | F21S 43/245 362/511 |
| 2015/0078025 A1* | 3/2015 | Kleiner | F21S 43/251 362/511 |
| 2017/0219180 A1* | 8/2017 | Kovach | F21S 43/40 |
| 2019/0242546 A1* | 8/2019 | Sakashita | F21S 43/239 |
| 2020/0116325 A1* | 4/2020 | Lee | F21S 43/15 |

FOREIGN PATENT DOCUMENTS

| | | | | |
|---|---|---|---|---|
| AT | 512803 A1 | 11/2013 | | |
| DE | 19939087 A1 | 2/2001 | | |
| DE | 10000992 A1 * | 7/2001 | | F21S 48/2281 |
| DE | 102005019093 A1 * | 10/2006 | | B60Q 1/0683 |
| DE | 102007049861 A1 * | 4/2009 | | F21S 41/24 |

* cited by examiner

*Primary Examiner* — Erin Kryukova
(74) *Attorney, Agent, or Firm* — Sterne, Kessler, Goldstein & Fox P.L.L.C.

(57) ABSTRACT

The present disclosure relates to an optical fiber apparatus, including an optical fiber with at least two separate input guide sections provided at one end with a cross-section which is given at least in sections and comprises an edge section having a first radius, which converge and successively unite via a merging section to form a common main guide section with a cross-section which is given at least in sections and includes an edge section having a second radius, so that light introduced into an input guide section is guided into the common main guide section, where the merging section extends over a length which corresponds to 10-50 times the first radius.

18 Claims, 3 Drawing Sheets

OPTICAL FIBER APPARATUS

TECHNICAL FIELD

The present disclosure relates to an optical fiber apparatus.

BACKGROUND

Optical fiber apparatuses are used, for example, in motor vehicle lighting. They make it possible to couple light that is coupled into the optical fiber apparatus or its optical fiber at one point and then to outcouple it again at another, more distant, position. Coupling is achieved by means of a light source module which is connected to the optical fiber and via which the light is coupled into one end face of the optical fiber. Sometimes the amount of light available from the light source module is not enough to provide the amount of light required at the other end of the optical fiber. For this purpose, optical fiber apparatuses are known which have an optical fiber with two or more separate input guide sections which combine to form a common main guide section. An example of this can be found in DE 199 39 087 A1. Each guide section is assigned a separate light source so that a correspondingly high amount of light can be coupled in and a correspondingly high amount of light can be coupled out at the other end. This makes it possible to provide a sufficiently bright light signal at the outcoupling location, even if the ambient brightness is correspondingly high, for example if one or more additional light displays are present in the surrounding area and are activated at the same time. Nevertheless, there is a need to design the optical fiber with lower losses in order to be able to either couple out a higher amount of light or to increase the length of the fiber.

BRIEF DESCRIPTION OF DRAWINGS/FIGURES

DETAILED DESCRIPTION

Figure 1:
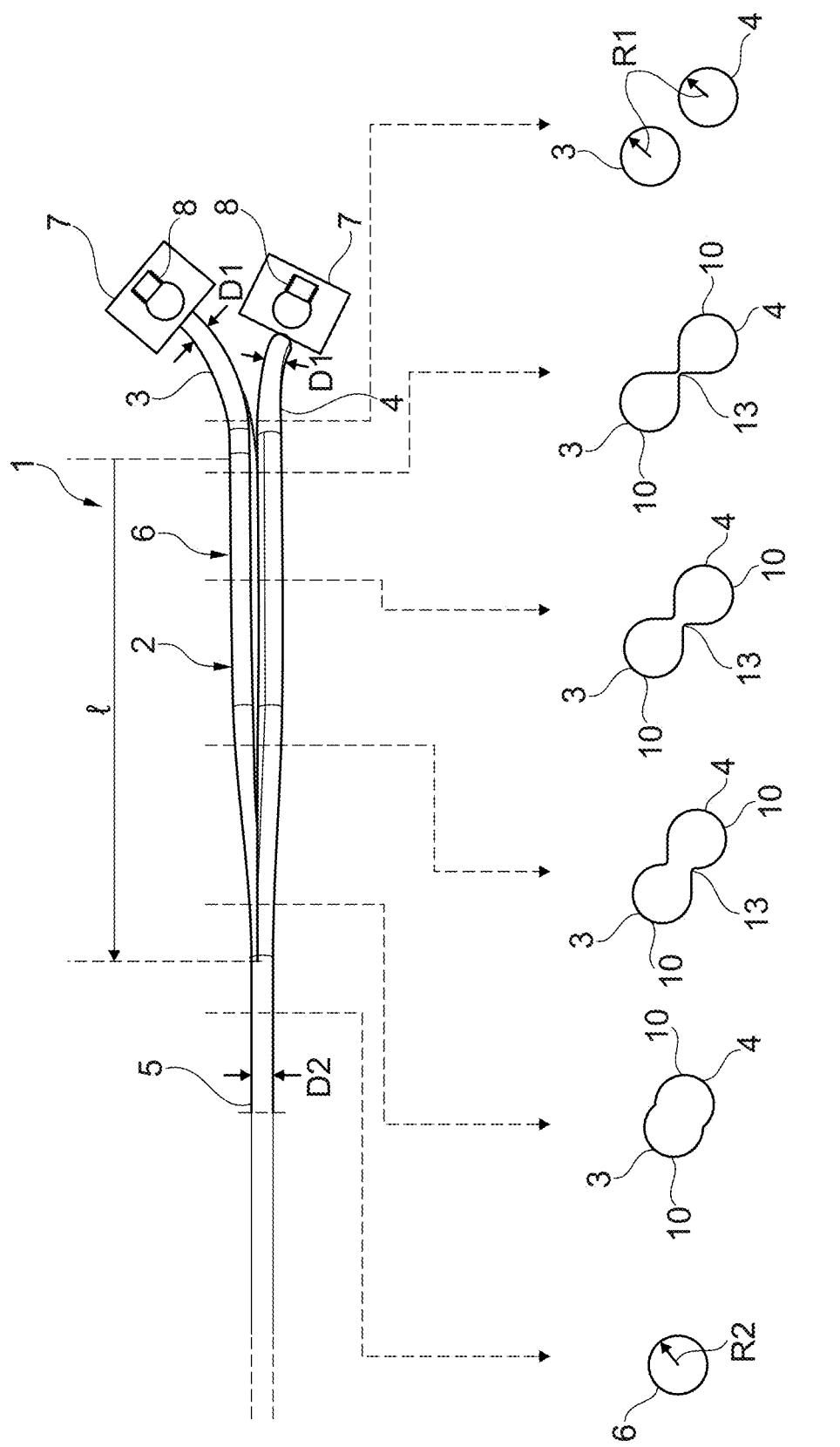
FIG. 1 illustrates six cross-sectional views of an optical fiber apparatus in different planes, according to aspects of the present disclosure.

The problem addressed by the present disclosure is therefore that of specifying an improved optical fiber apparatus.

In order to solve the problem, according to the present disclosure, an optical fiber apparatus is provided, comprising an optical fiber with at least two separate input guide sections provided at one end with a cross-section which is given at least in sections and comprises an edge section having a first radius (R1), which converge and successively unite via a merging section to form a common main guide section with a cross-section which is given at least in sections and comprises an edge section having a second radius (R2), so that light introduced into an input guide section is guided into the common main guide section, the merging section extending over a length which corresponds to 10-50 times the first radius.

In the optical fiber apparatus according to the present disclosure, at least two input guide sections are provided, both of which have a cross-sectional shape which in each case has an edge section forming a section of the outer circumference which is curved, which can therefore be defined by a radius. For example, circular, cylindrical cross-sectional shapes can be provided, which have a uniform radius around the circumference, or the D-shaped cross-sectional shape, with an edge section which runs around approximately 180°, for example, and has a diameter. The two input guide sections converge to form a common main guide section, i.e., they merge successively over a merging section until the two input guide sections have merged to form a single main guide section, which also has an edge section with a second radius, at least in sections, against a cross-section, which therefore also has a circular edge around at least part of its circumference, it thus also being possible to define this section by a radius. Preferably, this second cross-sectional shape is circular, i.e., the main line section is cylindrical, but it can also deviate from a cylindrical shape. What is essential to present disclosure here is the length of the merging section. According to the present disclosure, this corresponds to 15-50 times the first radius. This means that the length, measured from the point of first contact between the two input guide sections to the point at which they completely merge to form the main guide section with the second radius, corresponds to a multiple of the first radius, namely at least 10 times and at most 50 times the first radius. This is based on the finding that if the merging section is too short, the interfaces involved in the light reflection are at too large an angle to each other. This is because the two input guide sections are at a relatively large angle to each other and merge over a very short merging section to form the main guide section, which inevitably also runs at a corresponding angle to the input guide sections, the angle that the main guide section assumes relative to each individual input guide section corresponding more or less to half the angle of the two intertwining input guide sections to each other. The interfaces are therefore not parallel so that the angle of incidence, measured to the perpendicular to the interfaces, changes and increases. If the angle of the light beam hitting the interface exceeds the critical angle of total reflection, this can no longer be maintained and the light beam is coupled out of the optical fiber into the environment. This amount of light coupled out is no longer available, and is a loss. However, if, as provided by the present disclosure, a correspondingly long merging section is realized, corresponding angular relationships can be formed in which the interfaces involved, i.e., the lateral surfaces of the input guide sections and the main guide section, run at an angle to each other that ensures further total reflection so that there is a significant reduction in unwanted light outcoupling in the transition region between the input guide sections and the main guide section. This allows the amount of light coupled out at the end of the main guide section to be increased. Although this amount of light coupled out is regularly somewhat smaller than the amount of light coupled in, since there is always a certain loss over the length of the optical fiber, this loss can be noticeably reduced, since the transition region, i.e., the region of the merging section, is "defused" as a possible loss location due to the geometry according to the present disclosure. This in turn offers the possibility of being able to couple out a larger amount of light at the end of the main guide section, the same amount of light being coupled in, compared with an optical fiber not designed according to the present disclosure, or of lengthening the main guide section accordingly in order to be able to couple out the same amount of light at the end of the main guide section as with the optical fiber not designed according to the present disclosure but shorter in terms of the main guide section.

Limiting the length of the merging section to at least 10 times and at most 50 times the first radius has proven to be sufficient according to the present disclosure. A length of the merging section that corresponds to at least 10 times the first radius ensures that an appropriate angular geometry is given, that ensures that total internal reflection can be largely maintained. Beyond a length of the merging section is 50 times or more, no further improvement occurs. A specification of the length interval to at least 20 times the first diameter and at most 50 times, or possibly only at most 40 times, the first radius is conceivable.

According to a formulaic aspect of the present disclosure, each input guide section can, before the merging section, transition from a cylindrical cross-sectional shape into a drop-shaped cross-sectional shape, which it has at least at the beginning of the merging section, the input guide sections with the drop-shaped cross-sectional shapes merging successively. The first diameters of the two input guide sections have a round cross-sectional shape at their free end. They maintain this geometry until shortly before the beginning of the merging section. The geometry then changes to a drop shape, i.e., the geometry still has a part-circular section, i.e., the edge section, with the first radius, but it becomes narrower in the manner of a drop. The two input guide sections now merge with this drop-shaped cross-section, i.e., they touch each other at the beginning of the merging section and merge more and more with this drop shape over the length of the merging section until, at the end of the merging section, only a preferably circular cross-section with the second radius, i.e., the main guide section, is present.

In this case, according to an advantageous development in a specific implementation, the drop-shaped cross-sectional shape of the input guide sections in each case has an edge section extending around at least 180°, which merges on both sides into flat edge surfaces that open into a tip, the input guide sections converging with the tips and forming an increasingly wide connecting web over the merging section. That is to say that the two drop shapes run towards each other with their tips and touch each other, and continue to merge further over the length of the merging section, the two partially circular edge sections forming the essential outer edge over the merging section. Consequently, at the beginning of the merging section, a very narrow connecting web is initially formed over the converging tip sections, which becomes increasingly wider over the length of the merging section, the diametrically opposed, partially circular edges converging ever closer to one another until, at the end of the merging section, there is only one common, circular guide edge, which defines the main guide section.

Alternatively, other cross-sectional geometries are also conceivable. For example, it can be provided that each input guide section, starting from a cylindrical cross-sectional shape, changes into a D-shaped cross-sectional shape, which it has at least at the beginning of the merging section, before the merging section, the input guide sections with the D-shaped cross-sectional shape merging successively. Here, each input guide section, e.g., starting from a circular cross-sectional shape, has a D-shaped cross-sectional shape in front of the merging section, the two D-shaped input guide sections being virtually pushed into each other, with these D-shaped cross-sections, and fused, via the merging section.

The D-shaped cross-sectional shape of the input guide sections can each have an edge section extending around at least 180°, which either merges into flat edge surfaces on both sides, to which a base surface running orthogonally thereto adjoins, the two input guide sections running into one another with two edge surfaces running parallel to one another, or the edge section directly adjoining a base surface, the two input guide sections running into one another with their two base surfaces running parallel to one another by parallel displacement. The D cross-sections are therefore different. While one variant describes a "D" as shown, in the other variant the cross-sectional shape is more lens-shaped. Regardless of this, the two shapes are pushed into each other by a linear displacement.

According to a particularly advantageous aspect, the first and the second radius are equal. This means that, for example in the case of a circular cross-section with a first diameter of 4 mm at the entrance of the two input guide sections, i.e., where light is coupled into the front face via the respective light source module, the main guide section, which is preferably also round in cross-section, also has a diameter of 4 mm, starting immediately at the end of the merging section. Of course, the first and the second radius can also have larger or smaller values, for example 3 mm or 5 mm, 6 mm, 7 mm, 8 mm, 9 mm, or 10 mm, although this list is not exhaustive. However, regardless of the specific first diameter, the merging section is always at least 10 times and at most 50 times the first radius of the edge section.

The optical fiber is preferably made of plastics material, in particular polymethyl methacrylate (PMMA), polycarbonate (PC) or polystyrene (PS). The manufacture of the optical fiber from plastics material, such as preferably PMMA, PC or PS, allows the formation of the Y-geometry according to the present disclosure with the two input guide sections, the long merging section, specifically designed in particular with regard to the drop-shaped cross-sectional geometry, and the main guide section, using a suitable tool. A glass aspect is also conceivable.

The optical fiber apparatus further expediently comprises a connected light source module on each input guide section, which is firmly connected to the input guide section. The light source module has a corresponding receiving section into which the free end of the respective input guide section is inserted and in which a defined interface to the actual light source is formed so that the best possible coupling of the light can be realized. In this case, each light source module can preferably have one or more LEDs as light sources. In this case, this can be just one or more polychromatic LEDs (e.g., white, ice-blue) or monochromatic LEDs (e.g., red, yellow, amber, blue). Alternatively, RGB LEDs, i.e., at least three LEDs that emit light in the light colors red-green-blue, can be provided, light mixing being possible via these RGB LEDs and it being possible for any desired light color to be generated. A mixture of multiple LEDs of different types is also conceivable.

At the ends of both input guide sections connected to the light source modules, these can be circular in cross-section, but can also have other cross-sectional shapes. They can be oval, triangular or polygonal, for example, and other shapes are also conceivable, e.g., star-shaped or cloud-shaped, etc. These geometries can also be twisted in order to improve the light mixing. In the transition to the merging section, the input guide sections then preferably take on a circular cross-sectional shape, which then changes into the drop shape or the D-shape, for example, over which the fusion then takes place.

Furthermore, the present disclosure relates to a motor vehicle comprising at least one optical fiber apparatus of the type described above.

Additional advantages and details of the present disclosure are illustrated in the aspects described hereinafter and from the drawings.

FIG. 1 illustrates an optical fiber apparatus 1 according to the present disclosure, comprising an optical fiber 2 with two input guide sections 3, 4, and a main guide section 5. The two input guide sections 3, 4 merge via a merging section 6 to form the main guide section 5, which is described in detail below. Furthermore, two light source modules 7 are provided, which are connected to the free ends of the two input guide sections 3, 4. Each light source module 7 has at least one light source 8, which is illustrated here only symbolically. Preferably, these are one or more LEDs that emit either monochromatic or polychromatic light, or are designed as an RGB array. A defined amount of light can be coupled into each input guide section 3, 4 via each light source module 7, the light being passed on into the input guide sections 3, 4 via total reflection and reaching the main guide section 5 via the merging section 6, at the end of which it is coupled out.

Each input guide section has a circular cross-sectional shape with a first diameter D1 defined by a first radius R1. The main guide section 5 also has a circular cross-sectional shape with a second diameter D2, defined by a second radius R2. Preferably, D1=D2 or R1=R2, i.e., the two input guide sections 3, 4 merge with one another via the merging section 6 and finally form a main guide section 5 with the same diameter or the same radius.

It is essential that the merging section 6 has a corresponding length which corresponds to at least 5 times and at most 25 times the first diameter, or at least 10 times and at most 50 times the first radius. For example, if each input guide section 3, 4 has a first diameter of 4 mm, the length of the input guide section is between 20-100 mm. As FIG. 1 illustrates, the two input guide sections 3, 4 therefore run almost parallel or at a very small angle to each other along the merging section 6, in particular also in the region of the area that then merges into the main guide section 5, which leads to the interfaces involved in the total reflection, namely the lateral surfaces of the converging input guide sections 3, 4 and the main guide section 5, running almost parallel to each other. This ensures that the total reflection is almost completely maintained over the merging section 6 and in the transition to the main guide section 5, and that only minimal coupling losses occur in this area.

Below this, 6 different cross-sectional views of the optical fiber 2 are illustrated. These are located at six different levels I, II, III, IV, V, and VI, as illustrated in FIG. 1. The cross-sectional views illustrate the course of the fusion over the merging section 6.

The cutting plane I is still in the area in which the two input guide sections 3, 4 are not yet in contact with each other, i.e., immediately before the beginning of the merging section 6. As can be seen, both input guide sections 3, 4 have a circular cross-sectional shape with a first diameter D1.

Figure 2:
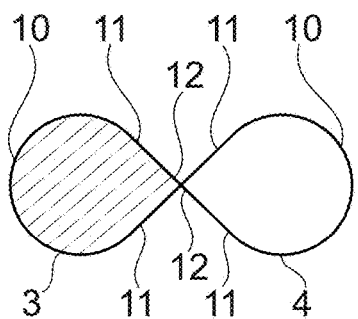
FIGS. 2-7 illustrate six cross-sectional views of the merging input guide sections, starting immediately at the beginning of the merging section and ending at the end of the merging section, according to aspects of the present disclosure.

The two input guide sections 3, 4 continue to run towards each other in the direction of the merging section 6. Here, the cross-sectional shape of the input guide sections 3, 4 changes from a circular cross-sectional shape to a drop-shaped cross-sectional shape, as illustrated in FIG. 2 described below. This drop-shaped cross-sectional shape is characterized by an edge section 10 extending around at least 180° with the first radius R1, over which the round cross-sectional shape is still maintained, but which merges into flat edge surfaces 11 on both sides, which then open into a tip 12, as FIG. 2 clearly illustrates. This configuration is present in both input guide sections 3, 4, the two input guide sections 3, 4 running towards each other with their two tips 12 and touching each other at the beginning of the merging section 6. At the beginning of the merging section 6, the two input guide sections 3, 4 then merge, as illustrated in the sectional view in plane II in FIG. 1. A connecting web 13 is formed, which (see FIG. 2) is still very narrow at the beginning.

The next cross-sectional view is in the plane III. Clearly, the fusion process has continued. The connecting web 13 has become wider, the two input guide sections 3, 4 and the circular edge sections 10 are moving closer together.

This fusion process continues, as illustrated in the cross-sectional view in the plane IV. It is clear that the connecting web 13 has become wider and the two edge sections 10 have moved closer together.

In the plane V, the fusion process is already very advanced. It is clear that the two input guide sections 3, 4 have almost completely merged into one another, with only a small edge unevenness remaining, resulting from the original drop-shaped geometry.

At the end of the merging section 6, the fusion process is fully completed. The two input guide sections 3, 4 are completely fused together and form the main guide section 6 which (see the sectional view in plane VI) has a circular cross-sectional shape with the second diameter D2, preferably both diameters being the same, i.e., D1=D2. The main guide section 5 thus has a corresponding edge section with a second radius R2, in this case, due to the circular cross-sectional shape the edge section completely bordering the main guide section 5.

The described fusion is of course accompanied by a reduction in the amount of optical fiber material, since with the same radii the cross-section of the two individual input guide sections 3, 4 inevitably has twice the cross-sectional area compared to the cross-sectional area of the main guide section 5; thus in this area there is twice the amount of optical fiber material compared with the area of the main guide section 5. That is to say that the structure comprising the two individual guide sections 3, 4 connects successively and also tapers via the merging section 6, the tapering being present in particular in the region in which the two individual guide sections 3, 4 are already connected to one another via a relatively wide connecting web 13. This is illustrated in the side view of the optical fiber 2 in FIG. 1, in particular in the area of the planes IV, V.

FIGS. 2-7 illustrate again in detail the fusion process and the resulting geometry change.

FIG. 2 illustrates the two input guide sections 3, 4 with their drop-shaped cross-sectional shape already described above. The two tips 12 touch each other directly at the beginning of the merging section 6.

Figure 3:
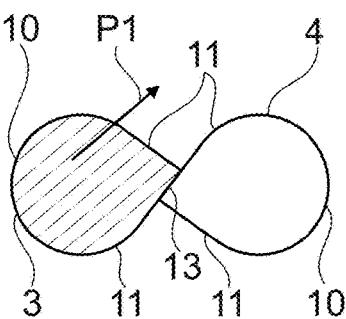
Figure 4:
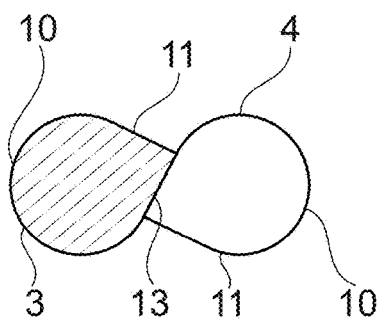

FIG. 3 illustrates the beginning of the fusion. The connecting web 13 is formed. As the arrow P1 illustrates, a displacement essentially occurs, which continues with increasing fusion, see FIG. 4.

Figure 5:
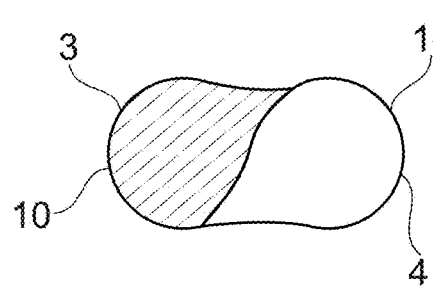

In FIG. 5, the two input guide sections 3, 4 have already melted together considerably, the actual drop shape has disappeared, and there are no more flat edge surfaces 11. Only the upper and lower sides still have a slightly wavy or recessed structure.

Figure 6:
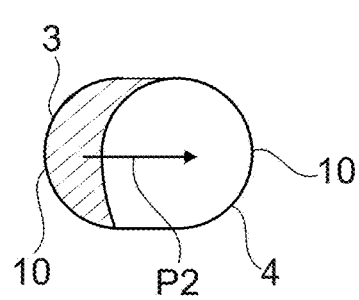
Figure 7:
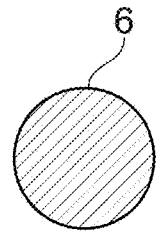

Subsequently, the two input guide sections 3, 4 are pushed into one another quasi with only progressive smoothing of the lateral surfaces, as illustrated in FIG. 6 by the arrow P2, until the final cross-sectional shape illustrated in FIG. 7 with the diameter D2 of the main guide section 6 is formed.

In FIGS. 2-6, the two input guide sections 3, 4 are illustrated differently for purposes of explanation, the input guide section 3 is dashed, the input guide section 4 is not dashed. The different sized cross-sectional areas resulting from the fusion, especially in FIGS. 5 and 6, are chosen for illustrative purposes only. Preferably, however, the two input guides 3, 4 merge successively and uniformly over the merging section 6. The main guide section 5 in FIG. 7 is again illustrated in dashed lines to indicate that this main guide section 5 is the result of the fusion of the two input guide sections 3, 4.

Figure 8:
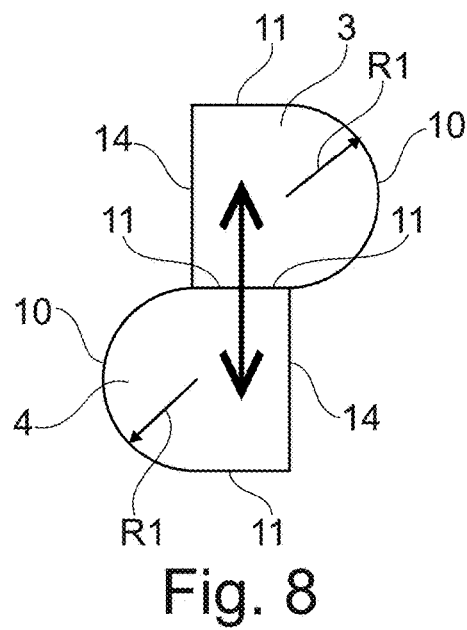
FIG. 8 illustrates a cross-sectional view of two input guide sections having a first D-shape, according to aspects of the present disclosure.
Figure 9:
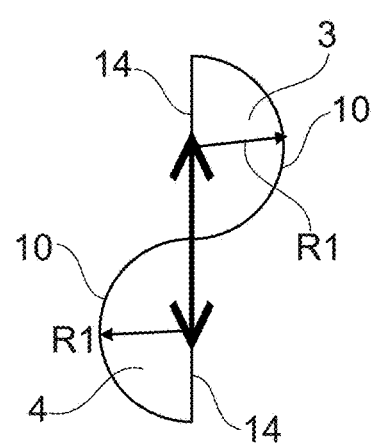
FIG. 9 illustrates a cross-sectional view of two input guide sections having a second D-shape, according to aspects of the present disclosure.

FIGS. 8 and 9 illustrate two different D-shaped cross-sectional shapes of the input guide sections 3, 4. Each input guide section 3, 4 has, before the merging section 6, a cylindrical cross-sectional shape that changes into a D-shaped cross-sectional shape, which it has at least at the beginning of the merging section 6, the input guide sections 3, 4 with the D-shaped cross-sectional shape merging successively.

FIG. 8 illustrates a D-shape which has an edge section 10 in each case that extends around approximately 180° and then merges on both sides into flat edge surfaces 11, to which a base surface 14 adjoins. The two edge sections 10 again have a first radius R1. The two input guide sections 3, 4 converge with the two adjacent edge surfaces and are quasi "pushed into each other", so that a main guide section 5 is finally formed, which is again round in cross-section, for example, and has a second radius, which preferably corresponds again to the first radius R1.

In the aspect according to FIG. 9, essentially lens-shaped cross-sections of the input guide sections 3, 4 are provided, which also each have an edge section 10 which extends around approximately 180°, but which here directly adjoins the base surface 14. The fusion takes place here by a parallel displacement of both base surfaces 14 until the main guide section with a round cross-section and the second radius R2 is formed.

Figure 10:
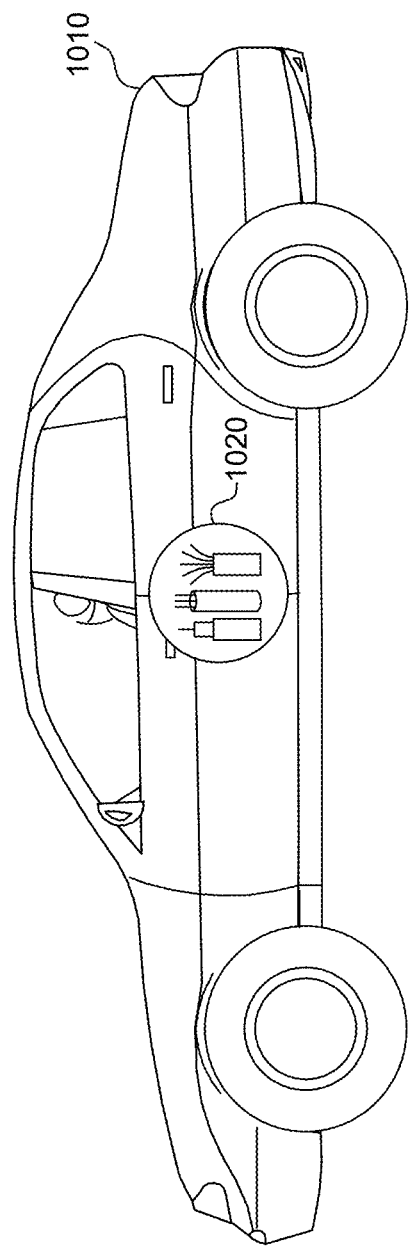
FIG. 10 illustrates a motor vehicle including at least one optical fiber apparatus, according to aspects of the present disclosure.

In some aspects, FIG. 10 illustrates a motor vehicle 1010 that may be equipped with at least one optical fiber apparatus 1020. Optical fiber apparatus 1020 can include the optical fiber apparatus 1 of FIG. 1 with cross-sectional views discussed with respect to FIGS. 1-9.

The invention claimed is:

1. An optical fiber apparatus, comprising:
an optical fiber having at least two separate input guide sections provided at one end of the optical fiber with a cross-section which is given at least in sections and comprises an edge section having a first radius,
wherein the at least two separate input guide sections converge and successively unite via a merging section to form a common main guide section with a cross-section which is given at least in sections and comprises the edge section having a second radius, so that light introduced into at least one of the at least two separate input guide section is guided into the common main guide section,
wherein each one of the at least two separate input guide sections changes, before the merging section, from a cylindrical cross-sectional shape to a drop-shaped cross-sectional shape, and
wherein the merging section extends over a length which corresponds to 10-50 times the first radius.

2. The optical fiber apparatus according to claim 1, wherein each one of the at least two separate input guide sections merges, at least at the beginning of the merging section, with the drop-shaped cross-sectional shape successively.

3. The optical fiber apparatus according to claim 2, wherein each one of the at least two separate input guide sections, with the drop-shaped cross-sectional shape, converges with a tip and forms an ever-widening connecting web over the merging section.

4. The optical fiber apparatus according to claim 3, wherein the drop-shaped cross-sectional shape of the at least two separate input guide sections has the edge section extending around at least 180°, wherein the edge section merges on both sides into flat edge surfaces, and wherein the flat edge surfaces open into the tip.

5. The optical fiber apparatus according to claim 1, wherein the first radius and the second radius are equal in size.

6. The optical fiber apparatus according to claim 1, wherein the optical fiber is made of glass or plastics material comprising polymethyl methacrylate (PMMA), polycarbonate (PC), or polystyrene (PS).

7. The optical fiber apparatus according to claim 1, wherein a light source module is firmly connected to each one of the at least two separate input guide sections.

8. The optical fiber apparatus according to claim 7, wherein the light source module has one or more light-emitting diodes (LEDs) as a light source.

9. A motor vehicle comprising at least the optical fiber apparatus according to claim 1.

10. An optical fiber apparatus, comprising:
an optical fiber having at least two separate input guide sections provided at one end of the optical fiber with a cross-section which is given at least in sections and comprises an edge section having a first radius,
wherein the at least two separate input guide sections converge and successively unite via a merging section to form a common main guide section with a cross-section which is given at least in sections and comprises the edge section having a second radius, so that light introduced into at least one of the at least two separate input guide section is guided into the common main guide section,
wherein each one of the at least two separate input guide sections changes, before the merging section, from a cylindrical cross-sectional shape to a D-shaped cross-sectional shape, and
wherein the merging section extends over a length which corresponds to 10-50 times the first radius.

11. The optical fiber apparatus according to claim 10, wherein each one of the at least two separate input guide sections merges, at least at the beginning of the merging section, with the D-shaped cross-sectional shape successively.

12. The optical fiber apparatus according to claim 11, wherein each one of the at least two separate input guide sections, with the D-shaped cross-sectional shape, runs into one another with two edge surfaces or two base surfaces.

13. The optical fiber apparatus according to claim 12, wherein the D-shaped cross-sectional shape of the at least two separate input guide sections has the edge section extending around at least 180° or directly adjoining a base surface, wherein the edge section merges on both sides into flat edge surfaces, and wherein the flat edge surfaces are adjoined by the base surface that runs orthogonally thereto.

14. The optical fiber apparatus according to claim 10, wherein the first radius and the second radius are equal in size.

15. The optical fiber apparatus according to claim 10, wherein the optical fiber is made of glass or plastics material comprising polymethyl methacrylate (PMMA), polycarbonate (PC), or polystyrene (PS).

16. The optical fiber apparatus according to claim 10, wherein a light source module is firmly connected to each one of the at least two separate input guide sections.

17. The optical fiber apparatus according to claim 16, wherein the light source module has one or more light-emitting diodes (LEDs) as a light source.

18. A motor vehicle comprising at least the optical fiber apparatus according to claim 10.

* * * * *